Feb. 4, 1930.   S. JOHNSON   1,745,425
BEARING CONSTRUCTION
Filed Feb. 25, 1927
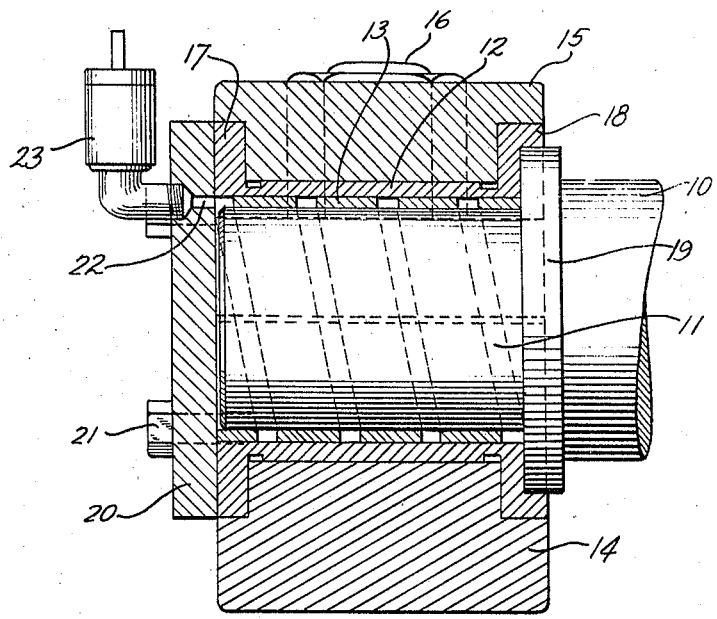
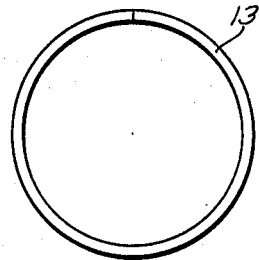
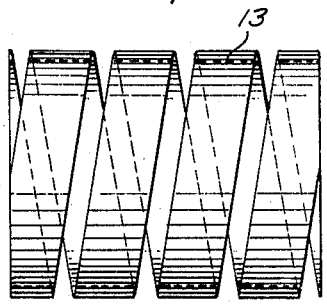
INVENTOR
Seth Johnson
BY
Robert S. Blair   ATTORNEY Patented Feb. 4, 1930

1,745,425

UNITED STATES PATENT OFFICE

SETH JOHNSON, OF NEW HAVEN, CONNECTICUT, ASSIGNOR TO THE SAFETY CAR HEATING & LIGHTING COMPANY, A CORPORATION OF NEW JERSEY

BEARING CONSTRUCTION

Application filed February 25, 1927. Serial No. 170,890.

This invention relates to bearing construction. One of the objects thereof is to provide a bearing construction which is practical and highly efficient. Another object is to provide a construction of the above nature which is conveniently kept in repair and in proper working order. Another object is to provide a construction of the above nature in which lubricant is dependably supplied to all parts of the bearing and particularly in cases wherein it is ordinarily difficult to keep a bearing lubricated properly, as in a bearing supporting an oscillating shaft or journal. Another object is to provide a construction of the above nature in which replacement of worn bushings is facilitated. Another object is to provide a construction of the above nature which is simple and inexpensive. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which is shown one of the various possible embodiments of this invention, Figure 1 is a vertical section;

Figure 2 is an end elevation of a bushing shown in Figure 1, and

Figure 3 is a side view of the bushing.

Similar reference characters refer to similar parts throughout the several views of the drawing.

Referring now to the drawing in detail, there is shown in Figure 1 a shaft 10 having an end journal portion 11 which is supported in this bearing. The bearing comprises a shell 12 having a substantially cylindrical interior within which is fitted a bushing 13. The bushing 13 is of a suitable bearing metal and the shell 12 is preferably made of a less expensive metal, such as steel or cast iron.

The bushing 13 is shown in Figures 2 and 3. It is in the form of a helical strip and is preferably made by rolling a strip of suitable bearing material into the helix shown. The helix is formed with a normal outer diameter larger than the inside diameter of the shell 12 and is contracted slightly when pushed into place within the shell. When in position, the helical bushing member thus bears outwardly against the inner walls of the shell 12 and its tendency to expand holds it in place.

The helix is formed with the adjacent coils thereof in spaced relation, as shown in the drawing, so that, when it is in place within the shell it forms a helical groove extending about the inner wall of the shell. This groove forms a path by means of which lubricant may be evenly distributed to all parts of the bearing.

The shell 12 is formed in one solid piece. As shown in Figure 1, it is carried in a suitable support 14 and firmly clamped in position therein by a removable cap 15 secured by clamping bolts 16. It will be understood that one or more of these clamping bolts 16 is provided for the cap 12 on either side of the bearing. By loosening the bolts 16 and removing the cap 15 the shell 12 with the bushing 13 therein may be lifted out of the support 14 and slid off the end of the journal 11.

The shell 12 is provided with radially extending end flanges 17 and 18. A shoulder 19 on the journal 11 engages with the outer surface of the flange 18, and a cap 20 is preferably secured against the flange 17. This cap covers the end of the bearing and the end of the journal and may be secured by bolts 21 which enter the flange 17, so that the cap is conveniently removable.

Through the cap 20 is a passage 22 by means of which lubricant may be admitted to the helical groove formed by the bushing 13. When grease is employd as a lubricant a grease cup 23 may be employed for forcing the grease through the passage 22 and along the helical groove to all portions of the bearing and the journal.

This bearing is capable of being renewed with the greatest convenience. It is necessary simply to remove the cap 15, slip the shell 12 from the end of the journal, remove the worn bushing 13 and spring a new bushing into place. The shell 12 may be used indefinitely. There is no waste of bearing metal and the necessity of cutting out grooves in the bearing or in the journal for the passage of grease is avoided.

This bearing construction is of particular advantage for supporting an oscillating shaft, such as the suspension shaft of a pivotally suspended generator in car lighting equipment. An oscillating shaft or journal of this type rotates through only a small angle, and it is very difficult ordinarily to properly lubricate the bearings. In the construction herein disclosed, lubricant is dependably supplied to every portion of the bearing surface.

As many possible embodiments may be made of the above invention and as many changes might be made in the embodiment above set forth, it is to be understood that all matter hereinbefore set forth, or shown in the accompanying drawing, is to be interpreted as illustrative and not in a limiting sense.

I claim as my invention:

1. In bearing construction, in combination, an outer shell having a substantially cylindrical interior, and a lining for the interior of said shell comprising a strip of bearing metal coiled into a cylindrical helix, said helix having normally an outer diameter greater than the inner diameter of said shell and being sprung into engagement with the inner wall of said shell and thereby held in place therein.

2. In bearing construction, in combination, a solid metal shell having a substantially cylindrical interior, a bushing within said shell comprising a strip of bearing metal in helical form, said helix having normally an outer diameter greater than the inner diameter of said shell and being sprung into engagement with the inner wall thereof, a support for said shell, and a removable cap for clamping said shell in position in said support.

3. In bearing construction, in combination, a solid metal shell having a substantially cylindrical interior, a bushing within said shell comprising a strip of bearing metal in helical form, said helix having normally an outer diameter greater than the inner diameter of said shell, the adjacent coils of said helix being spaced apart thereby forming a helical groove about the interior of said shell, a journal entering said bushing from one end, a cap closing the other end of said bushing and of said shell, and means for forcing lubricant through said cap into the adjacent end of said groove.

In testimony whereof, I have signed my name to this specification this sixteenth day of February, 1927.

SETH JOHNSON.